United States Patent [19]
Laven et al.
[11] 4,224,165
[45] Sep. 23, 1980

[54] CYCLICAL CENTRIFUGAL MACHINE

[75] Inventors: Thomas R. Laven; Donald L. Hurley; Joseph B. Bange, all of Hamilton; Francis H. Wessel, North Bend, all of Ohio

[73] Assignee: The Western States Machine Company, Hamilton, Ohio

[21] Appl. No.: 969,393

[22] Filed: Dec. 14, 1978

[51] Int. Cl.[2] .............................................. B01D 33/10

[52] U.S. Cl. ...................................... 210/363; 308/26; 308/236

[58] Field of Search ............... 210/363, 143, 144, 145, 210/364–368; 74/572–574; 308/460, 236, 26, 184 R, 184 A; 233/1 R, 1 C, 23 A

[56] References Cited

U.S. PATENT DOCUMENTS

| | | | |
|---|---|---|---|
| 2,895,023 | 7/1959 | Blum | 210/144 |
| 3,847,453 | 11/1974 | Herbert | 308/26 |
| 3,921,775 | 11/1975 | Matyschik | 308/236 |
| 3,979,155 | 9/1976 | Sood et al. | 308/26 |
| 4,096,988 | 6/1978 | Scuricini | 233/1 C |

*Primary Examiner*—Frank Sever
*Attorney, Agent, or Firm*—St. Onge, Steward, Johnston, Reens & Noe

[57] ABSTRACT

An improved cyclical centrifugal machine includes a rigid support mounted above the basket of the machine, a bearing housing suspended from the support for gyratory motion, a basket-carrying spindle rotatable in fixed position relative to the housing on bearings therein, and an electric motor for bringing the spindle and basket to rotational speed. The improved centrifugal machine further includes a buffer system for resisting gyration of the bearing housing, spindle, and basket as well as a sensing system for detecting when such gyration, nevertheless, becomes excessive and for then discontinuing driving of the spindle and basket by the motor.

12 Claims, 4 Drawing Figures

FIG. 1
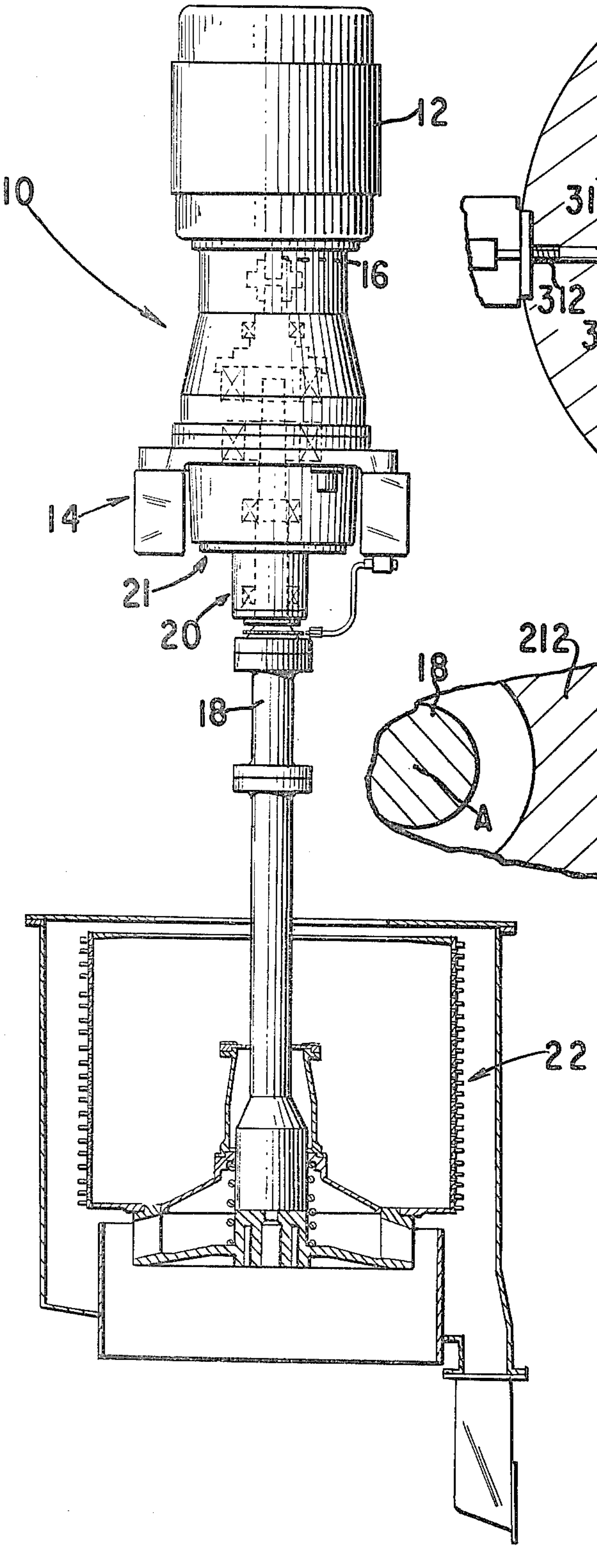
FIG. 3
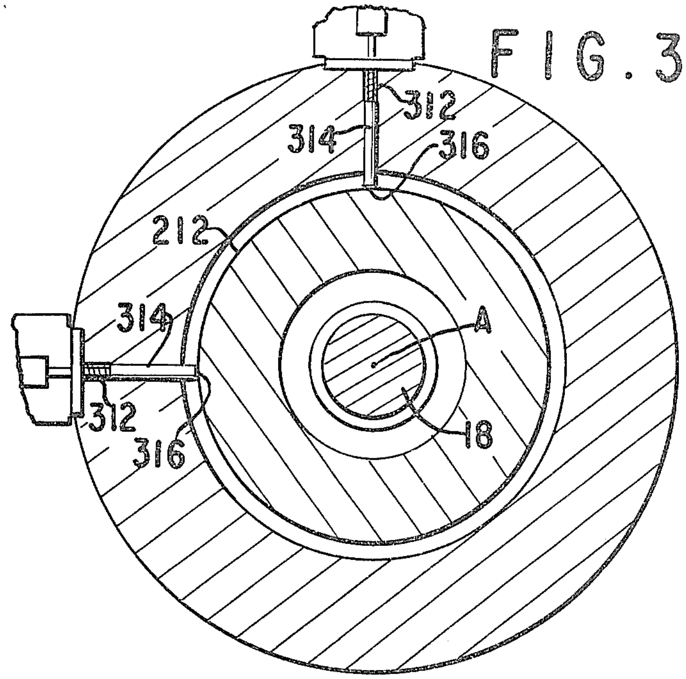
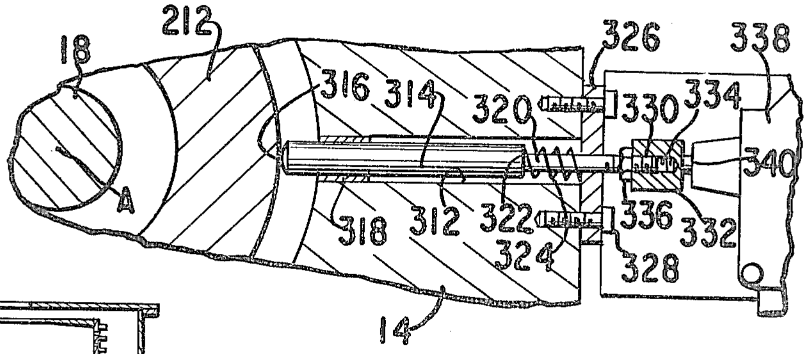
FIG. 4

CYCLICAL CENTRIFUGAL MACHINE

The present invention relates to an improved cyclical centrifugal machine that incorporates several features for increasing its efficiency and for making its operation more safe. Such machines are used to separate liquid from solids in large scale industrial processes and have particular application in the manufacture, refining and drying of sugar, dextrose, and other crystalline or granular materials.

Centrifugal machines of this type usually include a large rotary cylindrical basket that is carried on a spindle rotatable on bearings in a fixed position relative to a bearing housing that is suspended in a rigid support mounted above the basket. A rotary prime mover, ordinarily an AC induction motor, rotates the spindle and basket at high speed to centrifugally separate liquid from solids in the basket. The motor is also operable on the spindle and basket to rotate them at lower speeds during different phases of cyclical machine operation.

When the basket is loaded, the material therein often is not symmetrically distributed about the axis of the basket. Accordingly, an imbalance may result that causes the basket and spindle, as well as the bearing housing which supports the spindle, to gyrate about the common axis which they define when at rest. Excessive basket gyration is undesirable since it reduces the productivity of the machine because the machine must be shut down until gyration returns to acceptable levels. Excessive gyration in typical large size centrifugal machines is also dangerous.

A principal object of the present invention is to provide an improved system for sensing excessive gyration of the basket, spindle, and bearing housing during any phase of cyclical operation of the centrifugal machine and for automatically discontinuing driving of the spindle thereupon.

A further object of the invention is to provide an improved buffer system for resisting gyration of the spindle and bearing housing during all phases of cyclical operation of the centrifugal machine.

A further object of the invention is to provide an improved buffer system for resisting gyration of the basket, spindle, and bearing housing that provides independent adjustment of gyration-resisting restoring forces in both the radial and axial directions.

In its preferred embodiment, the improved cyclical centrifugal machine of the present invention includes a rigid support mounted above the basket of the machine, a bearing housing suspended from the support for gyratory motion, a basket-carrying spindle rotatable in fixed position relative to the housing on bearings therein, and an electric motor for bringing the spindle and basket to rotational speed.

The improved gyration sensing system of the present invention includes a plurality of plungers mounted in the support for movement substantially radially of the spindle on axes spaced apart about the axis of the spindle. Each of the plungers has an inner end that bears against the bearing housing so that gyration of the housing axially displaces at least one plunger. A limit switch is mounted in operative relation to the end of each plunger opposite its bearing end. Therefore, at least one limit switch is operated by outward displacement of one of the plungers beyond a certain limiting position indicative of excessive gyration to discontinue driving of the spindle.

In its preferred embodiment, the improved buffer system of the present invention comprises a radial annular abutment surface fixed to one of the support and housing and, fixed to the other of them, a rigid ring structure forming a first annular channel that confronts the radial surface. A first elastic ring is confined in the channel and protrudes therefrom into pressing engagement with the radial surface. An axial abutment surface is also fixed to one of the support and housing and, fixed to the other of them, is a rigid ring structure forming a second annular channel that confronts the axial surface. A second elastic ring is confined in the second channel and protrudes therefrom into pressing engagement with the axial surface. Elastic ring clamping assemblies are adapted to permit adjustment of the pressure between either of the radial or axial surfaces and its associated elastic ring without altering the pressure between the other of the surfaces and its associated elastic ring.

Other objects, features and advantages of the present invention will appear from the following detailed description of exemplary embodiments thereof and from the accompanying drawings illustrating said embodiments.

FIG. 1 is a side elevational view, partly in vertical cross-section, of a cyclical centrifugal machine constructed in accordance with the preferred embodiment of the present invention.

FIG. 3 is a vertical cross-sectional view taken through plane 3—3 in FIG. 2 showing the position of adjacent plungers forming part of the system for sensing excessive gyration of the bearing housing, spindle, and basket of the centrifugal machine.

FIG. 4 is an enlarged horizontal cross-sectional view showing the plunger assembly in detail.

Figure 2:
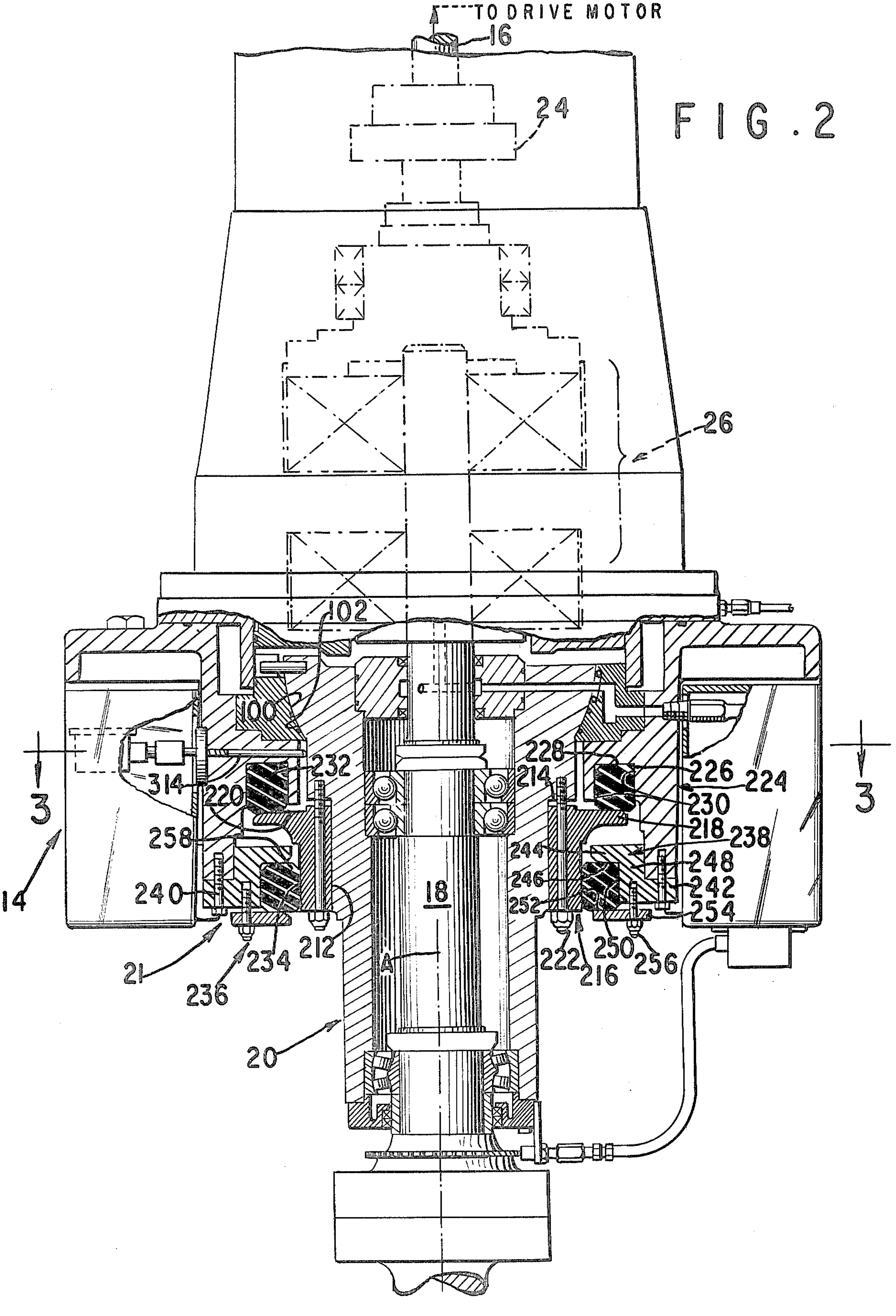
FIG. 2 is an enlarged side elevational view, also partly in cross-section, showing portions of the system for sensing excessive bearing housing, spindle and basket gyration and the system for resisting said gyration.

FIG. 1 illustrates a heavy cyclical cylindrical machine, generally indicated at 10, incorporating improved features in accordance with the present invention. The centrifugal machine comprises a rotary prime mover, in the form of a large electric motor 12, mounted on a rigid fixed support 14, only a part of which is shown in the interest of clarity. The shaft 16 of the motor is coupled to a spindle 18 mounted in a fixed position for rotation in a bearing housing 20 that is vertically suspended for gyratory motion in a suitable head 21 mounted in support 14. At its bottom end, the spindle carries a large centrifugal basket 22 that is rotated by the electric motor 12 at different speeds during different phases of machine operation. The motor 12 may include low and high speed windings, the low speed winding being energized to rotate the basket at relatively low speed during the operation of discharging solids from the basket or during loading of the basket. The windings may be serially energized to bring the basket to high top centrifuging speed.

Referring now to FIG. 2, it can be seen that the motor shaft 16 is connected through a suitable flexible coupling 24 to a clutch/brake unit, generally indicated at 26, which is in turn connected to the spindle 18. The clutch/brake unit is operated to transmit torque from the motor to the spindle during the various phases of operation of the machine. As can be seen further in FIG. 2, the bearing housing 20 in which the spindle 18 is rotatably mounted is formed at its upper end with a partially spherical ball 100 that mates with and is supported in a similarly partially spherical socket 102 formed in the gyratory head 21.

When the basket 22 is loaded, the material to be centrifuged often is not distributed symmetrically about the Axis A that the spindle, basket and housing define when at rest. Therefore, an imbalance in the basket may result that causes the basket to gyrate about the Axis A when rotated.

Therefore, the centrifugal machine 10 of the invention incorporates a buffer system for resisting or damping gyratory motion of the spindle 18, basket 22 and bearing housing 20 in the gyratory head 21 that otherwise is permitted by the bearing housing ball-gyratory head socket joint.

The buffer system for resisting such gyratory motion of the basket, spindle and housing is shown in detail in FIG. 2. As can be seen there, the bearing housing is formed at a location below the ball 100 with a cylindrical section 212 that terminates at its upper end in an annular shoulder 214. A rigid cylindrical ring 216 is mounted in coaxial relation to make a sliding fit with the cylindrical section 212 and is formed at its upper end with a radially outwardly directed flange 218 that presents a radially outwardly extending axially facing radial abutment surface 220. The ring 216 is secured to the bearing housing by a number of bolts 222 extending in a generally axial direction therethrough and tapped into the housing at the shoulder 214. Bolts 222 also permit the axial position of the ring 212 to be adjusted relative to the shoulder 214.

The support structure 14 is formed with a first rigid ring structure 224 in the region immediately above the flange 218 of the rigid cylindrical ring 216. The ring structure defines an annular channel 226 having a base 228 confronting the radial abutment surface 220, and opposing annular side walls 230. A toroidal elastic ring 232 is confined in the channel 226 and protrudes therefrom into pressing engagement with the radial abutment surface 220.

Elastic ring 232 exerts a force in the direction of Axis A when compressed between the base 228 of the channel 226 and the radial abutment surface 220. The axial force determines the force with which the ball 100 of the bearing housing is received in the socket 102 of the gyratory head and, therefore, also determines the frictional restoring force that is exerted between the ball and socket which tends to resist gyratory motion of the spindle, basket and bearing housing relative to the head. Bolts 222 may be loosened or tightened to displace the rigid ring 216 axially relative to the bearing housing and thereby displace the radial abutment surface 220 relative to the confront base 228 of the channel 226. Therefore, the compression of the elastic ring 232 between the radial abutment surface and the base 228 of the channel and the frictional restoring force between the ball and socket may be adjusted by means of the bolts 222.

The rigid cylindrical ring 216 is further formed with a cylindrical peripheral surface 234 that constitutes an axially extending or axial abutment surface. A second rigid ring structure, generally indicated at 236, fixed to the support at a location below the first rigid ring structure 224, comprises a member 238 having an S-shaped cross-section that is secured to the support structure by bolts 240 tapped through one leg 242 thereof. A second leg 244 of the structure 236 constitutes one side wall 246 and the interconnecting leg 248 constitutes a base 250. An opposing side wall 252 completing a second annular channel is defined by an annular flange 254 secured to the member 238 by a plurality of bolts 256. A second toroidal elastic ring 258 is confined in the second annular channel and protrudes therefrom into pressing engagement with the axial abutment surface 234 to exert a radial restoring force between this abutment surface and base 250.

The radial compression force exerted by the elastic ring 258 between the base 250 and axial abutment surface 234 may be adjusted by positioning the flange member 254 so as to set a desired compression and protrusion of the elastic ring confined in the second channel. It will be appreciated that adjustment of the pressure exerted by this elastic ring 258 in the radial direction may be done independently of adjustment of the pressure exerted by the first elastic ring 232 in the axial direction.

Even though a system for damping gyratory motion of the basket, spindle and bearing housing in a centrifugal machine is provided, gyration may occasionally become excessive, resulting in either or both inefficient or unsafe machine operation. Therefore, the machine of the invention includes a system for detecting excessive gyration and thereupon discontinuing driving of the spindle and basket by the motor.

As can be seen in FIG. 3, the fixed support 14 is provided with at least two relatively small diameter bores 312 that extend radially from the Axis A of the bearing housing and spindle and are spaced apart by an angle of about 90 degrees. Each of the bores carries a plunger in the form of an elongated rod 314 having an inner end 316 that bears against the exterior of the bearing housing at a location immediately below the terminus of the ball 100.

As shown in greater detail in FIG. 8, a suitable bushing 318 supports each rod 314 in its respective bore 312 for free axial reciprocal movement. Each rod has an outer section 320 of smaller diameter than the remainder thereof. An annular shoulder 322 is formed at the juncture of the outer section 320 of smaller diameter and the remainder of the rod 314 and a compressed coil spring 324 is seated at one end against the shoulder and at its opposite end against a retaining plate 326 secured to the fixed support 14 by suitable means such as bolts 328. It will be appreciated that the coil spring yieldably presses each rod against the outer surface of the bearing housing.

The outer section 320 of each rod is further provided with exterior thread 330. A cap 332 having an internally threaded bore 334 is received on the threaded end 330 of the rod and is held in a chosen axial position by a locknut 336, also threaded on the end 330 of the rod. By varying the axial position of the cap on the threaded end of the rod, the effective length of the rod can be varied.

The system further comprises a microswitch 338 mounted on the fixed support 14 adjacent the cap 332 carried on each rod 314, each microswitch having a switch button 340 positioned in operative relation to the cap 332 carried on the rod. Each microswitch is connected to the central control system for the centrifugal machine and is operable when opened to interrupt supply of power to the electric motor, thereby stopping rotation of the spindle and basket. Alternatively, the microswitch may operate a clutch to interrupt transmission of torque from the electric motor to the spindle and/or brake to stop rotation of the spindle and basket.

In the preferred embodiment, the cap 332 is threaded to a position on the end 330 of the rod 314 so that a gap of 0.01 inch exists between the end of the cap and the switch button 340 of the microswitch. It will be appreciated that varying the effective length of the rod by varying the axial position of the cap relative thereto serves to adjust the limiting position of the rod at which the microswitch is operated. Therefore, the system may be set to discontinue operation of the basket at different selectable degrees of gyration. Moreover, by mounting similar rod and switch assemblies with the rod axes spaced apart by about 90 degrees, gyration in all degrees about Axis A may be detected.

The centrifugal machine of the invention accordingly incorporates significant improvements over prior machines. More efficient and safe operation results.

Although a specific embodiment of the improved centrifugal machine has been described above in detail, it is to be understood that this is for purposes of illustration. Modification may be made to the described structure in order to adapt it to particular applications.

What is claimed is:

1. In a cyclical centrifugal machine having a gyratory suspension head, including rigid support means to be mounted above the basket of the machine, a bearing housing suspended from said support means for gyratory motion, a basket spindle rotatable in fixed position relative to said housing on bearings therein, and buffer means to resist gyration of said spindle and bearing housing, the improvement wherein said buffer means comprises:

a radial annular abutment surface fixed to one of said support means and said housing and, fixed to the other of them, rigid means forming a first annular channel that confronts said radial surface, said channel having an elastic ring confined therein and protruding therefrom in pressing engagement with said radial surface;

an axial annular abutment surface fixed to one of said support means and said housing and, fixed to the other of them, rigid means forming a second annular channel that confronts said axial surface, said second channel confining therein an elastic ring protruding therefrom in pressing engagement with said axial surface; and means for independently adjusting the pressure between either of said surfaces and the related elastic ring without altering the pressure between the other of said surfaces and its elastic ring.

2. A gyratory suspension head according to claim 1, said bearing housing having a rigid ring mounted thereon at a location below said head, said rigid ring being formed with an outwardly protruding flange presenting said radial abutment surface, said first channel being formed by parts of a rigid ring structure fixed to said support means.

3. A gyratory suspension head according to claim 2, said adjusting means including means for displacing said rigid ring axially relative to said bearing housing to set the pressure desired between said flange and the elastic ring confined in said first channel.

4. A gyratory suspension head according to claim 1, said bearing housing having a rigid ring mounted thereon at a location below said head, said axial abutment surface being constituted by a cylindrical peripheral surface of said rigid ring, said second channel being formed by parts of a rigid ring structure fixed to said support means.

5. A gyratory suspension head according to claim 4, said adjusting means including means for displacing a side wall of said second channel relative to an opposite side wall thereof so as to set a desired compression and protrusion of the elastic ring confined in said second channel.

6. A gyratory suspension head according to claim 1, said abutment surfaces being formed on a rigid ring mounted on said bearing housing at a location below said head, said channel forming means being parts of a rigid ring structure fixed to said support means.

7. A gyratory suspension head according to claim 6, said rigid ring being formed with an outwardly protruding flange presenting said radial abutment surface on its upper side, and being formed below said flange with a cylindrical peripheral surface constituting said axial abutment surface, said adjusting means including:

means for displacing said rigid ring axially relative to said bearing housing to set the pressure desired between said flange and the elastic ring confined in said first channel; and means for displacing a side wall of said second channel relative to an opposite side wall thereof so as to set a desired compression and protrusion of the elastic ring confined in said second channel.

8. A gyratory suspension head according to claim 1, further comprising improved means for sensing excessive gyration of said spindle and housing and for thereupon discontinuing driving of the spindle, said sensing means comprising a plurality of plungers mounted for movement substantially radially of said spindle on axes spaced apart about the axis of the spindle, each of said plungers having an inner end bearing against said bearing housing so that the plunger is displaced by gyration of said housing, and switch means operable by outward displacement of any of said plungers beyond a certain limiting position for discontinuing driving of said spindle.

9. A gyratory suspension head according to claim 8, said plungers being mounted on axes spaced apart at an angle of about 90 degrees.

10. A gyratory suspension head according to claim 9, said switch means comprising for each of said plungers a microswitch mounted adjacent and operable by an outer end of the plunger.

11. A gyratory suspension head according to claim 9, each of said plungers comprising a rod extending freely through a radial bore in said support means, and spring means yieldably pressing each said rod against said bearing housing.

12. A gyratory suspension head according to claim 11, each of said switch means comprising for each said plunger a microswitch mounted adjacent and operable by the outer end of the plunger rod, each said plunger comprising means for adjusting the effective length of the plunger rod so as to set the limiting position thereof at which the related microswitch is operated.

* * * * *